(12) United States Patent
Karkow et al.

(10) Patent No.: US 11,047,572 B2
(45) Date of Patent: Jun. 29, 2021

(54) POROUS FLAME HOLDER FOR LOW NOX COMBUSTION

(71) Applicant: ClearSign Combustion Corporation, Seattle, WA (US)

(72) Inventors: Douglas W. Karkow, Des Moines, WA (US); Joseph Colannino, Bellevue, WA (US); Robert E. Breidenthal, Seattle, WA (US); Christopher A. Wiklof, Everett, WA (US)

(73) Assignee: CLEARSIGN TECHNOLOGIES CORPORATION, Seattle, WA (US)

( * ) Notice: Subject to any disclaimer, the term of this patent is extended or adjusted under 35 U.S.C. 154(b) by 544 days.

(21) Appl. No.: 14/652,773

(22) PCT Filed: Sep. 23, 2014

(86) PCT No.: PCT/US2014/057072
§ 371 (c)(1),
(2) Date: Jun. 16, 2015

(87) PCT Pub. No.: WO2015/042613
PCT Pub. Date: Mar. 26, 2015

(65) Prior Publication Data
US 2015/0330625 A1 Nov. 19, 2015

Related U.S. Application Data

(63) Continuation-in-part of application No. PCT/US2014/016632, filed on Feb. 14, 2014.
(Continued)

(51) Int. Cl.
*F23C 3/00* (2006.01)
*F23D 14/66* (2006.01)
(Continued)

(52) U.S. Cl.
CPC .............. *F23D 14/66* (2013.01); *F23C 3/002* (2013.01); *F23D 14/14* (2013.01); *F23D 14/64* (2013.01);
(Continued)

(58) Field of Classification Search
CPC ..... F23D 14/14; F23D 14/82; F23D 2203/105
(Continued)

(56) References Cited

U.S. PATENT DOCUMENTS 2,095,065 A * 10/1937 Hays .................... F23C 99/006
431/328
3,155,142 A * 11/1964 Stack .................... F23C 99/00
431/328
(Continued)

FOREIGN PATENT DOCUMENTS

CN 101514815 8/2009
CN 102853424 1/2013
(Continued)

OTHER PUBLICATIONS

Fric, Thomas F., "Effects of Fuel-Air Unmixedness on NOx Emissions", 1993 Jounal of Propulsion and Power, vol. 9, No. 5, Sep.-Oct. pp. 708-713. (Year: 1993).*
(Continued)

*Primary Examiner* — Avinash A Savani
(74) *Attorney, Agent, or Firm* — Christopher A. Wiklof; James C. Larsen; Launchpad IP, Inc.

(57) ABSTRACT

A burner includes a porous flame holder configured to support a combustion reaction to achieve a very low output of oxides of nitrogen (NOx).

30 Claims, 6 Drawing Sheets

Related U.S. Application Data

(60) Provisional application No. 61/887,741, filed on Oct. 7, 2013, provisional application No. 61/881,368, filed on Sep. 23, 2013.

(51) Int. Cl.

| | | |
|---|---|---|
| *F23D 14/64* | (2006.01) | |
| *F23L 15/04* | (2006.01) | |
| *F23D 14/70* | (2006.01) | |
| *F23D 14/82* | (2006.01) | |
| *F23D 14/14* | (2006.01) | |
| *F23D 14/74* | (2006.01) | |

(52) U.S. Cl.
CPC ............. *F23D 14/70* (2013.01); *F23D 14/74* (2013.01); *F23D 14/82* (2013.01); *F23L 15/04* (2013.01); *F23C 2203/20* (2013.01); *F23D 2203/102* (2013.01); *F23D 2203/105* (2013.01)

(58) Field of Classification Search
USPC .................................................. 431/7, 8, 328
See application file for complete search history.

(56) References Cited

U.S. PATENT DOCUMENTS

| | | | |
|---|---|---|---|
| 3,228,614 A | 1/1966 | Bauer | |
| 3,258,058 A * | 6/1966 | Herault | F23C 99/00 431/329 |
| 3,321,001 A * | 5/1967 | Vezzoli | F23C 99/00 431/22 |
| 3,324,924 A | 6/1967 | Hailstone et al. | |
| 3,434,791 A * | 3/1969 | Hayashi | F23C 99/00 431/328 |
| 3,488,137 A * | 1/1970 | Naganuma | D06F 67/02 431/329 |
| 3,635,644 A * | 1/1972 | Reid, Jr. | F23D 14/14 431/9 |
| 3,807,940 A * | 4/1974 | Juricek | B01F 5/0405 239/423 |
| 3,847,536 A * | 11/1974 | Lepage | F23D 14/14 431/329 |
| 4,021,188 A * | 5/1977 | Yamagishi | F23C 6/04 431/10 |
| 4,081,958 A * | 4/1978 | Schelp | F02C 7/14 431/170 |
| 4,397,356 A | 8/1983 | Retallick | |
| 4,408,461 A | 10/1983 | Bruhwiler et al. | |
| 4,483,673 A | 11/1984 | Murai et al. | |
| 4,588,373 A | 5/1986 | Tonon et al. | |
| 4,643,667 A * | 2/1987 | Fleming | F23D 14/16 431/328 |
| 4,673,349 A * | 6/1987 | Abe | F23D 14/12 126/92 AC |
| 4,726,767 A | 2/1988 | Nakajima | |
| 4,752,213 A * | 6/1988 | Grochowski | F23D 14/02 431/328 |
| 4,799,879 A * | 1/1989 | Laspeyres | F23D 14/14 431/328 |
| 5,248,255 A | 9/1993 | Morioka et al. | |
| 5,326,257 A * | 7/1994 | Taylor | F23D 14/14 431/329 |
| 5,375,999 A | 12/1994 | Aizawa et al. | |
| 5,409,375 A | 4/1995 | Butcher | |
| 5,439,372 A | 8/1995 | Duret et al. | |
| 5,441,402 A | 8/1995 | Reuther et al. | |
| 5,496,171 A * | 3/1996 | Ozawa | F23D 14/12 126/92 AC |
| 5,511,516 A * | 4/1996 | Moore, Jr. | F23D 14/14 122/18.31 |
| 5,511,974 A * | 4/1996 | Gordon | F23D 14/02 431/328 |
| 5,567,147 A * | 10/1996 | Fenn | F23D 14/14 431/328 |
| 5,641,282 A | 6/1997 | Lee et al. | |
| 5,645,412 A * | 7/1997 | Besik | F23C 9/006 431/115 |
| 5,667,374 A * | 9/1997 | Nutcher | F23D 14/02 431/328 |
| 5,718,573 A * | 2/1998 | Knight | F23D 14/62 126/116 R |
| 5,975,883 A * | 11/1999 | Carbone | F23C 6/04 126/110 R |
| 5,993,192 A | 11/1999 | Schmidt et al. | |
| 6,095,798 A | 8/2000 | Mitani et al. | |
| 6,179,608 B1 * | 1/2001 | Kraemer | F23D 14/82 239/552 |
| 6,575,736 B1 * | 6/2003 | Aust | F23D 14/14 431/328 |
| 6,997,701 B2 | 2/2006 | Volkert et al. | |
| 7,878,798 B2 * | 2/2011 | Poe | F23D 14/08 431/115 |
| 9,377,190 B2 | 6/2016 | Karkow et al. | |
| 9,388,981 B2 | 7/2016 | Karkow et al. | |
| 9,447,965 B2 | 9/2016 | Karkow et al. | |
| 9,797,595 B2 * | 10/2017 | Karkow | F23D 14/74 |
| 2002/0155403 A1 | 10/2002 | Griffin et al. | |
| 2002/0197574 A1 * | 12/2002 | Jones | F23C 6/047 431/8 |
| 2003/0054313 A1 | 3/2003 | Rattner et al. | |
| 2004/0058290 A1 * | 3/2004 | Mauzey | F23D 11/102 431/243 |
| 2004/0081933 A1 | 4/2004 | St. Charles et al. | |
| 2004/0197719 A1 * | 10/2004 | Chung | F23C 6/047 431/8 |
| 2006/0141413 A1 | 6/2006 | Masten et al. | |
| 2008/0268387 A1 | 10/2008 | Saito et al. | |
| 2010/0178219 A1 | 7/2010 | Verykios et al. | |
| 2011/0036341 A1 * | 2/2011 | Catalogue | F23D 14/02 126/39 E |
| 2011/0076628 A1 | 3/2011 | Miura et al. | |
| 2012/0164590 A1 * | 6/2012 | Mach | F23D 14/145 431/328 |
| 2012/0231398 A1 | 9/2012 | Carpentier et al. | |
| 2012/0301836 A1 * | 11/2012 | Akagi | F23D 14/02 431/328 |
| 2012/0301837 A1 * | 11/2012 | Akagi | F23D 14/08 431/328 |
| 2013/0273485 A1 * | 10/2013 | Lenoir | F23D 14/14 431/329 |
| 2014/0080079 A1 * | 3/2014 | Luo | F23D 14/145 431/328 |
| 2015/0118629 A1 | 4/2015 | Colannino et al. | |
| 2015/0276212 A1 * | 10/2015 | Karkow | F23D 14/74 431/253 |
| 2015/0276217 A1 * | 10/2015 | Karkow | F23D 14/74 431/328 |
| 2015/0285491 A1 | 10/2015 | Karkow et al. | |
| 2015/0316261 A1 | 11/2015 | Karkow et al. | |
| 2015/0362177 A1 * | 12/2015 | Krichtafovitch | F23C 99/001 431/8 |
| 2015/0362178 A1 * | 12/2015 | Karkow | F23C 99/001 431/8 |
| 2015/0369477 A1 | 12/2015 | Karkow et al. | |
| 2016/0003471 A1 * | 1/2016 | Karkow | F23C 5/06 431/2 |
| 2016/0018103 A1 * | 1/2016 | Karkow | F23N 5/123 431/8 |
| 2016/0025333 A1 * | 1/2016 | Karkow | F23C 99/001 431/285 |
| 2016/0025374 A1 * | 1/2016 | Karkow | F24H 1/205 122/14.22 |
| 2016/0025380 A1 | 1/2016 | Karkow et al. | |
| 2016/0046524 A1 * | 2/2016 | Colannino | C04B 7/4438 44/628 |
| 2016/0091200 A1 * | 3/2016 | Colannino | F23Q 3/008 431/328 |
| 2016/0230984 A1 * | 8/2016 | Colannino | F23N 5/022 |
| 2016/0238240 A1 * | 8/2016 | Colannino | F23D 14/14 |
| 2016/0238242 A1 * | 8/2016 | Karkow | F23M 9/06 |
| 2016/0238277 A1 * | 8/2016 | Colannino | F24H 6/00 |

(56) References Cited

U.S. PATENT DOCUMENTS

| | | | | |
|---|---|---|---|---|
| 2016/0238318 A1* | 8/2016 | Colannino | ............ | F27B 9/2469 |
| 2016/0245509 A1* | 8/2016 | Karkow | ................ | F23D 14/48 |
| 2016/0290639 A1* | 10/2016 | Karkow | ................ | F23D 14/26 |
| 2016/0298838 A1* | 10/2016 | Karkow | ................ | F23D 14/26 |
| 2016/0298840 A1* | 10/2016 | Karkow | ................ | F23D 14/32 |
| 2016/0305660 A1* | 10/2016 | Colannino | ............. | F23N 5/082 |
| 2016/0348899 A1* | 12/2016 | Karkow | ................ | F23D 14/02 |
| 2016/0348900 A1* | 12/2016 | Colannino | ............. | F23D 14/70 |
| 2016/0348901 A1* | 12/2016 | Karkow | .................... | F23D 1/00 |
| 2017/0010019 A1* | 1/2017 | Karkow | ................ | F23M 9/06 |
| 2017/0038063 A1* | 2/2017 | Colannino | ............. | F23D 14/14 |
| 2017/0038064 A1* | 2/2017 | Colannino | ............ | F23C 99/006 |
| 2017/0051913 A1* | 2/2017 | Colannino | ............. | F23C 9/08 |
| 2017/0146232 A1* | 5/2017 | Karkow | .................... | F23C 5/06 |
| 2017/0184303 A1* | 6/2017 | Colannino | ............. | F23D 14/14 |
| 2017/0191655 A1* | 7/2017 | Colannino | ............. | F23D 14/14 |
| 2017/0268772 A1* | 9/2017 | Lang, Sr. | ................ | F23D 14/70 |
| 2019/0041062 A1* | 2/2019 | Zhao | ........................ | F23R 3/42 |

FOREIGN PATENT DOCUMENTS

| | | |
|---|---|---|
| DE | 102009028624.1 | 2/2011 |
| EP | 0628146 | 12/1994 |
| JP | 07-243622 | 9/1995 |
| WO | WO 1995/000803 | 1/1995 |
| WO | WO 2015/042615 | 3/2015 |
| WO | WO 2015/054323 | 4/2015 |
| WO | WO 2015/061760 | 4/2015 |
| WO | WO 2015/070188 | 5/2015 |
| WO | WO 2015/112950 | 7/2015 |
| WO | WO 2015/123149 | 8/2015 |
| WO | WO 2015/123381 | 8/2015 |
| WO | WO 2015/123670 | 8/2015 |
| WO | WO 2015/123683 | 8/2015 |
| WO | WO 2015/123694 | 8/2015 |
| WO | WO 2015/123696 | 8/2015 |
| WO | WO 2015/123701 | 8/2015 |
| WO | WO 2016/007564 | 1/2016 |

OTHER PUBLICATIONS

Villermaux, Emmanuel, "Mixing and Spray Formation in Coaxial Jets", 1998, Jounal of Propulsion and Power, vol. 14, No. 5, Sep.-Oct., pp. 807-817 (Year: 1998).*

Patrent Appeal Board Decision, 2015. United States Patent and Trademark Office U.S. Appl. No. 14/741,264. (Year: 2015).*

Arnold Schwarzenegger, A Low NOx Porous Ceramics Burner Performance Study, California Energy Commission Public Interest Energy Research Program, Dec. 2007, San Diego State University Foundation.

EPO Extended Search Report and Search Opinion of EP Application No. 14751185.1 dated Feb. 21, 2017.

PCT International Search Report and Written Opinion of International PCT Application No. PCT/US2014/057-72 dated Jan. 15, 2015.

Howell, J.R., et al.; "Combustion of Hydrocarbon Fuels Within Porous Inert Media," Dept. of Mechanical Engineering, The University of Texas at Austin. Prog. Energy Combust. Sci., 1996, vol. 22, p. 121-145.

* cited by examiner

POROUS FLAME HOLDER FOR LOW NOX COMBUSTION

CROSS-REFERENCE TO RELATED APPLICATIONS

The present application is a U.S. National Phase application under 35 U.S.C. 371 of co-pending International Patent Application No. PCT/US2014/057072, entitled "POROUS FLAME HOLDER FOR LOW NOx COMBUSTION", filed Sep. 23, 2014; which application claims the priority benefit of U.S. Provisional Patent Application No. 61/887,741, entitled "POROUS FLAME HOLDER FOR LOW NOx COMBUSTION", filed Oct. 7, 2013; and U.S. Provisional Patent Application No. 61/881,368, entitled "PROGRESS AND RECENT ADVANCES USING ELECTRODYNAMIC COMBUSTION CONTROL (ECC)", filed Sep. 23, 2013; which is a Continuation-in-part of International Patent Application No. PCT/US2014/016632, entitled "FUEL COMBUSTION SYSTEM WITH A PERFORATED REACTION HOLDER", filed Feb. 14, 2014; each of which, to the extent not inconsistent with the disclosure herein, is incorporated herein by reference.

BACKGROUND

NOx is a pollutant regulated by the EPA and a key metric of burner performance. Strict new NOx control regulations are being implemented in several regions of the country including Texas and California. California's South Coast Air Quality Management District's Rule 1146 required that burners produce less than 9 ppm of NOx no later than July 2014. Industry groups anticipate that these limits will soon be further reduced to as low as 5 ppm in some areas with the rest of the country to follow suit.

To address this challenge, some burner and combustion system manufacturers have been able to develop systems that can achieve the NOx targets, but inherent design tradeoffs impose high costs to energy efficiency that become prohibitive at these very low emissions levels, even with natural gas at historically low prices.

The biggest cost associated with prior art Low- and Ultra-Low NOx burners has been the significant loss in energy efficiency that results. This loss stems directly from the combined effect of recirculating flue gas and increasing excess air to cool the combustion reaction along with a loss of turn-down because of flame instability, and can result in substantial increases in fuel consumption and parasitic power losses of up to 20-30%.

The market has long preferred low NOx and Ultra-Low NOx burners to more costly post-combustion treatment alternatives such as Selective Catalytic Reduction (SCR) systems that are more costly to install, complex to operate and consume considerable quantities of hazardous materials such as anhydrous ammonia.

SUMMARY

An embodiment demonstrated a 95% reduction in NOx emissions (down to less than 2 ppm) using a prototype burner based on a porous flame holder in a furnace operating at a temperature of ~1600 F with $O_2$ concentrations ranging from 2.5% to 3.2% and virtually no CO.

Embodiments achieve reductions in NOx to 2 ppm without costly FGR or SCR systems. In addition, flame length is reduced by up to 80%. And, unlike other low NOx systems, the burner keeps oxygen at normal operating levels (1-3%), and can maintain a stable combustion reaction throughout a wide operating range. Because of these features, the burner enables significant advantages in fuel efficiency and process throughput as compared to conventional Low- and Ultra-low-NOx burners.

Many traditional Low-NOx burners make use of increased flame length and reduced momentum to reduce NOx, but the resulting poor 'flame pattern' can cause combustion reaction impingement and coking. Refinery process heaters are particularly sensitive to this problem, due to the direct negative impact on product throughput and plant revenue as the firing rate must be throttled to avoid equipment damage. According to our analysis, a 3% to 7% loss in firing capacity due to poor flame pattern can cost millions of dollars annually in lost process throughput. Removing this bottleneck could improve plant profitability by between $12 and $28 million per plant, per year. This is of particularly high value because it leverages so much capital plant by increasing capacity.

According to an embodiment, a burner includes a fuel nozzle assembly, configured to output a gaseous mixture including fuel and oxidant, and a porous flame holder defining a plurality of gas passages, each having a minimum dimension equal to or greater than a fuel quenching distance, aligned to receive the gaseous mixture, the gas passages being configured to pass a combustion reaction supported by the gaseous mixture. The gas passages each include a wall configured to receive heat from a reacting portion of the gaseous mixture, radiate and/or conduct the heat toward an unreacted portion of the gaseous mixture, and output the heat adjacent to the unreacted portion of the gaseous mixture to heat the gaseous mixture. The porous flame holder maintains stable combustion within the gas passages. The heat provided to the mixture in the gas passages can keep the combustion reaction stable even at fuel/oxidant mixtures at or below a lean flammability limit that would be stable in a conventional burner.

According to an embodiment, a method of lowering combustion NOx includes outputting fuel and oxidant to a burner, allowing time for the mixture to evolve to a better-mixed state, and then combusting the mixture inside a porous flame holder. The the porous flame holder is configured to receive heat from the combustion reaction in each of a plurality of gas passages inside the porous flame holder, and conduct heat to the mixture sufficiently to cause stable combustion to be supported inside the porous flame holder.

According to an embodiment, a diluted fuel burner includes a fuel nozzle assembly configured to output a gaseous mixture including fuel and oxidant, a porous flame holder defining gas passages aligned to receive the gaseous mixture, the gas passages being configured to carry a combustion reaction supported by the gaseous mixture, and a porous flame holder support structure configured to hold the porous flame holder away from the fuel nozzle assembly at a dilution distance selected to allow dilution of the gaseous mixture.

DETAILED DESCRIPTION

Figure 1A:
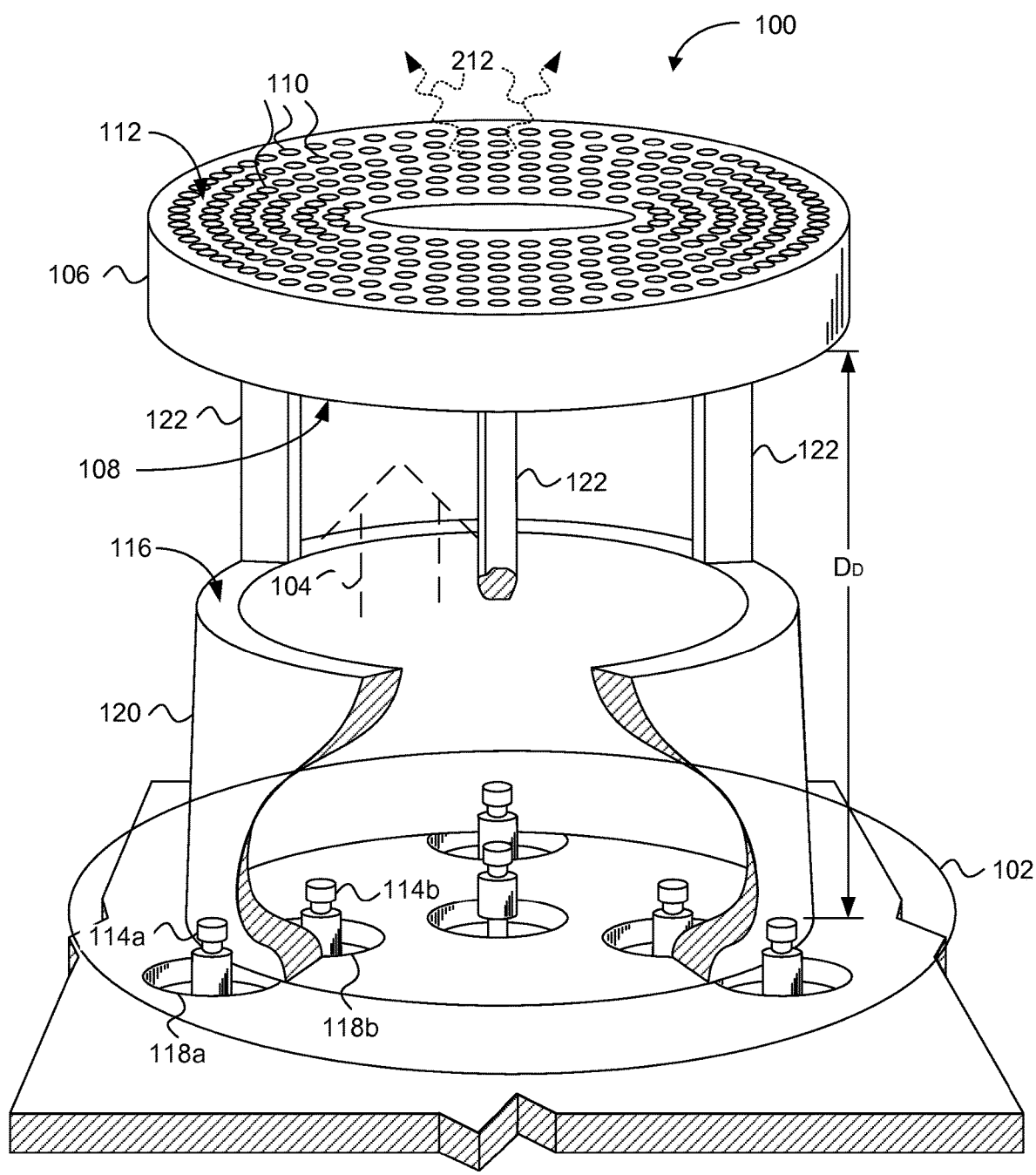
FIG. 1A is a cutaway view of a burner, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1B:
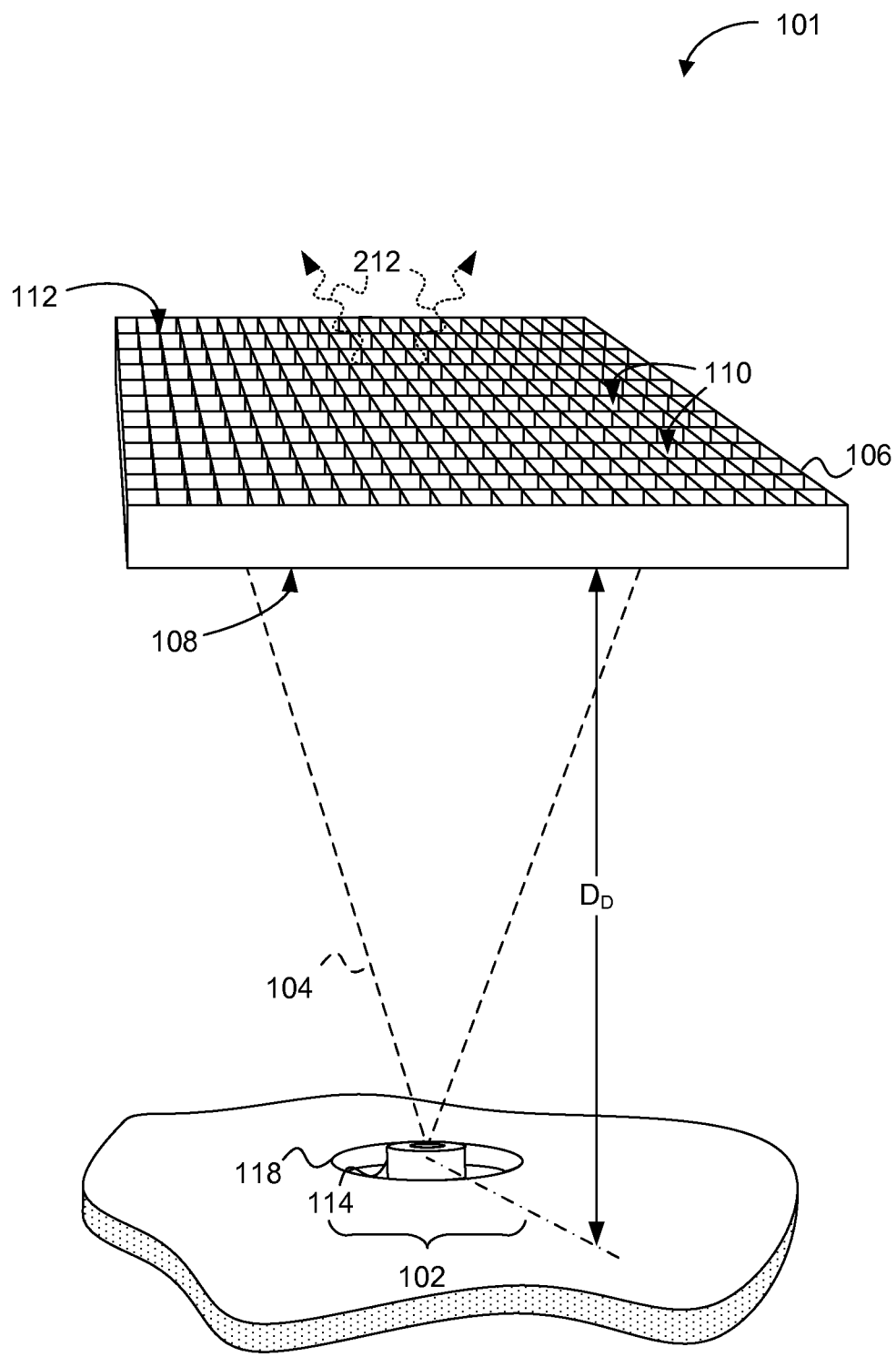
FIG. 1B is a diagram of a burner, according to another embodiment.

FIG. 1A is a diagram of a burner 100, according to an embodiment. FIG. 1B is a diagram of a burner 101, according to another embodiment. Referring to FIGS. 1A and 1B, The burner 100, 101 includes a fuel nozzle assembly 102 configured to output a gaseous mixture 104 including fuel and oxidant. A porous flame holder 106 is aligned to receive the gaseous mixture 104 at an upstream surface 108. The porous flame holder 106 defines a plurality of gas passages 110, each of the gas passages 110 being configured to carry a combustion reaction supported by the gaseous mixture 104. In some embodiments, each of the gas passages 110 can have a minimum lateral dimension equal to or greater than a flame quenching distance.

Figure 2:
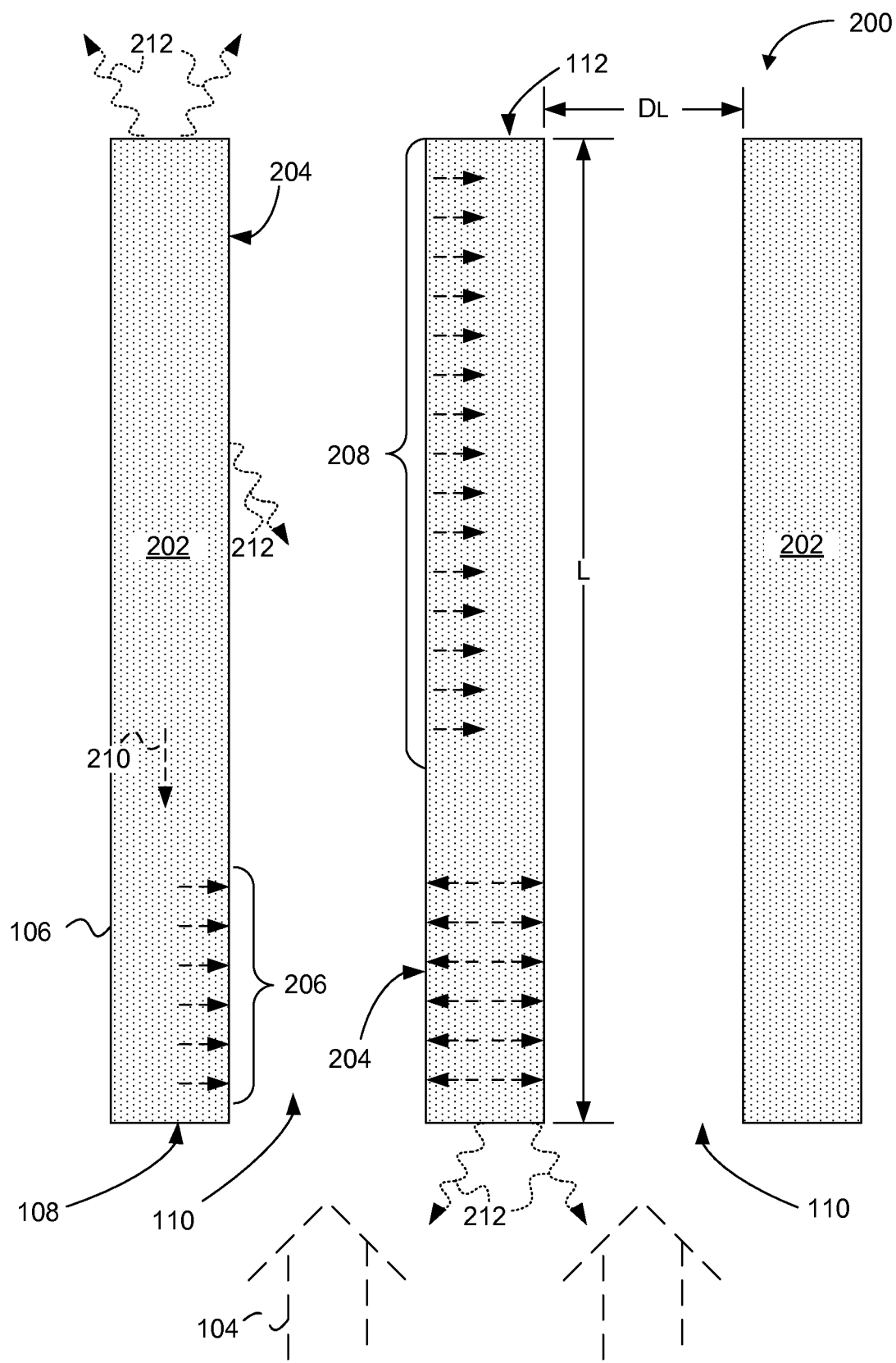
FIG. 2 is a side sectional diagram of a plurality of gas passages included in the porous flame holder portion of the burner of FIG. 1, according to an embodiment.

FIG. 2 is a side sectional diagram 200 of a plurality of gas passages 110 included in the porous flame holder 106 portion of the burners 100, 101 of FIGS. 1A and 1B, according to an embodiment. A minimum lateral dimension $D_L$ is illustrated. Flame quenching distance refers to a lateral dimension through which a flame will not pass. There are two senses in which the gas passages 106 have dimensions D greater than the quenching distance. In both senses, the flame is kept in a state of ignition within each gas passage and is allowed to pass freely therethrough (although thermal and aerodynamic effects described below typically confine the combustion reaction to occur substantially within the gas passages 110, between the upstream surface 108 and a downstream surface 112 of the porous flame holder 106).

In the classical sense, the quenching distance is a tabulated value that is determined under stoichiometric conditions. It is generally considered a property of the fuel and exists as a tabulated property. Most hydrocarbons have quenching distances of about 0.1". For example, NACA Lewis Report 1300 tabulates quenching distance as shown in Table 1.

TABLE 1

FUEL QUENCHING DISTANCES

| HYDROCARBON FUEL | QUENCHING DISTANCE |
| --- | --- |
| n-Butane | 0.12" |
| Methane | 0.10" |
| Propane | 0.08" |
| Hydrogen | 0.025" |

The quenching distance represents the diameter of an orifice such that a stoichiometrically premixed flame cannot propagate upstream through the orifice into a premix reservoir. The mechanism is essentially one of heat abstraction—the flame giving up too much energy as it attempts to flashback through the orifice.

In contrast to porous flame holders 106 described herein, radiant burners that support surface combustion must have a minimum pore size less than the quenching distance for the particular fuel and temperature to avoid flashback, and it could be considered a tautology that if the flame flashes back, the pore size must be greater than the actual quenching distance under the operating conditions.

In a second sense, the porous flame holder 106 includes gas passages 110 that are larger than an operating quenching distance by virtue of the fact that the porous flame holder 106 is hot under normal, steady state operating conditions. As such, the body 202 of the porous flame holder 106 will generally not abstract sufficient heat from a flame travelling through a gas passage 110 to quench the flame even if the dimension $D_D$ is below the classically defined quenching distance.

Since this is a thermal argument, actual flashback can occur through the quenching distance if the orifice is very hot—for example, if a premixed burner reservoir is receiving radiant heat from a hot furnace, e.g., a premix burner in ethylene service. But even so, in general the quenching distance does not change dramatically inasmuch as the flow of premixed fuel and air in the gaseous mixture 104 tend to cool the upstream end 206 of the walls 204 defining the gas passages 110. In one range of embodiments, the plurality of gas passages 110 each have a lateral dimension $D_L$ between 0.05 inch and 1.0 inch. Preferably, the plurality of gas passages 110 have a lateral dimension $D_L$ between 0.1 inch and 0.5 inch. For example the plurality of perforations can have a lateral dimension $D_L$ of about 0.2 to 0.4 inch. In some embodiments, the gas passages 110 have substantially constant cross sectional areas. In other embodiments, the gas passages 110 can have non-constant cross sectional areas.

Moreover, the gaseous mixture 104 is typically introduced to the upstream surface 108 of the porous flame holder 106 at a dilution below the lean flammability limit of the fuel (more on that below).

The gas passages 110 each include a wall 204 configured to receive heat from an exothermic reacting portion of the gaseous mixture and from hot products of the exothermic reaction, transmit the heat toward an unreacted portion of the gaseous mixture, and output the heat adjacent to an unreacted portion of the gaseous mixture. The inventors have found that heat is apparently received from the combustion reaction along a heat receiving area 208 of the gas passage 110 walls 204 that starts at about ⅓ of the length L from the upstream surface 108 to the down stream surface 112 of the porous flame holder 106 all the way to the downstream surface 112 of the perforated flame holder 106. Heat is conveyed upstream along the body 202 of the porous flame holder 106 through thermal conduction (diagrammatically depicted as 210), thermal radiation (diagrammatically depicted as 212), or (most likely) both thermal conduction 210 and thermal radiation 212. Net heat flow from the walls 204 of the gas passages 110 to the incoming gaseous mixture 104 apparently occurs in regions 206 that extend from the upstream surface 108 of the porous flame holder 106 to about ⅓ of the length L from the upstream surface 108 to the downstream surface 112 of the porous flame holder.

The gas passages 110 are configured to fix a location of the combustion reaction in a flow of the gaseous mixture 104 by virtue of the heat transfer effects described above. At steady state operating conditions, the gas passages 110 of the porous flame holder 106 are configured to hold the combustion reaction supported by the gaseous mixture 104 substantially between the upstream surface 108 and the downstream surface 112 of the porous flame holder 106.

During start-up, after the porous flame holder 106 has been preheated, but before equilibrium is reached, the inventors have noted blue flames extending downstream of the downstream surface 112 of the porous flame holder 106. Even in these conditions, however, it is believed that a majority, i.e. over 50%, of the combustion reaction occurs between the upstream surface 108 and the downstream surface 112 of the porous flame holder 106.

In other experiments, the inventors found that a portion of the combustion reaction can occur in a region near and immediately upstream from the upstream surface 108 of the porous flame holder 106. This is believed to be due to a combination of conduction (or convection) from the upstream ends of the porous flame holder body 202 defining the walls 204 of the gas passages and flow stagnation in the gaseous mixture 104 caused by aerodynamic effects of the upstream ends of the flame holder body 202. Aside from transient effects, such as pulsing, the majority of the combustion reaction is carried within the porous flame holder 106, between the upstream surface 108 and the downstream surface 112.

The plurality of gas passages 110 can include a plurality of elongated squares. In another embodiment, the plurality of gas passages 110 can include a plurality of elongated hexagons. The porous flame holder 106 can be formed from VERSAGRID® ceramic honeycomb, available from Applied Ceramics, Inc. of Doraville, S.C., (illustrated in FIG. 1B) for example. In another embodiment, the porous flame holder 106 can be formed from a plurality of tubes bundled together. In another embodiment, the porous flame holder 106 can be formed from an interleaved crimped surface and flat surface coiled together. In another embodiment, the porous flame holder 106 can be formed as a reticulated fiber mesh. In another embodiment, the porous flame holder 106 can be formed as a structured or unstructured packing. In another embodiment, the porous flame holder 106 can be formed as holes drilled in a fiber reinforced refractory material (illustrated in FIG. 1A).

In some embodiments the gas passages 110 can pass from the upstream surface 108 of the porous flame holder 106 to the downstream surface 112 of the porous flame holder 106 separately. In other embodiments the gas passages can pass from the upstream surface 108 to the downstream surface 112 of the porous flame holder with intersections configured to allow comingling if the gaseous mixture 104 or the combustion reaction supported by the gaseous mixture within the porous flame holder 106. The porous flame holder 106 can be constructed of a solid body or of a composite body, such as reticulated fibers or layered sheets.

The porous flame holder 106 can be formed from a refractory material such as alumina. Additionally or alternatively, the porous flame holder 106 can be formed from cordierite or mullite. In some embodiments, the porous flame holder 106 can be formed from a fiber reinforced cast refractory material. In another embodiment, the porous flame holder 106 can be formed from a metal superalloy such as Hastelloy or Inconel.

The inventors found that for a given flow velocity, a larger dimension $D_L$ in a gas passage 110 requires a larger length L of the gas passage 110 to reach the lowest NOx production. For tested combinations, the length L was equal to the distance between the upstream surface 108 and downstream surface 112 of the porous flame holder 106. Similarly, smaller $D_L$ was found to operate effectively with a smaller gas passage length L. Lengths L tested by the inventors range from about 1 inch to 8 inches, with the larger porous flame holder 106 thicknesses having larger dimension gas passages 110. E.g., 2-inch thick porous flame holders 106 were tested at gas passage sizes corresponding to densities ranging from about 16 gas passages 110 per square inch (nominally a 0.25 inch square gas passage 110) to 100 gas passages per square inch (nominally a 0.10 inch square gas passage 110). A six inch thick porous flame holder 106 was tested at a gas passage density of 4 gas passages 110 per square inch (nominally a 0.5 inch square gas passage 110) to 16 gas passages 110 per square inch.

The inventors tested porous flame holders 106 having void fractions between about 0.3 to greater than 0.7. The void fraction of a porous flame holder 106 is defined as the total area of all gas passages 110, divided by a total area bounded by the upstream surface 108. Some porous flame holder 106 embodiments can operate with less than 0.10 void fraction or more than 0.90 void fraction, but the inventors believe that a porous flame holder 106 having a void fraction between these limits is preferable. At a low void fraction, a porous flame holder 106 may exhibit undesirable pressure drop in the flowing gaseous mixture 104. Between the two tested void fractions, the 0.70 void fraction porous flame holder 106, illustrated in FIG. 1B, produced lower NOx concentration than did the 0.30 void fraction porous flame holder 106 illustrated in FIG. 1A.

The inventors have achieved stable heat outputs ranging from about 0.114 MBTU/(hr*ft$^2$) (million BTUs per hour per square foot of porous flame holder surface) to 1.2 MBTU/(hr*ft$^2$) while maintaining 3% $O_2$ in the stack. The inventors believe higher (stable) heat fluxes will probably be achieved with sufficient heat load to maintain a steady state temperature.

Figure 3:
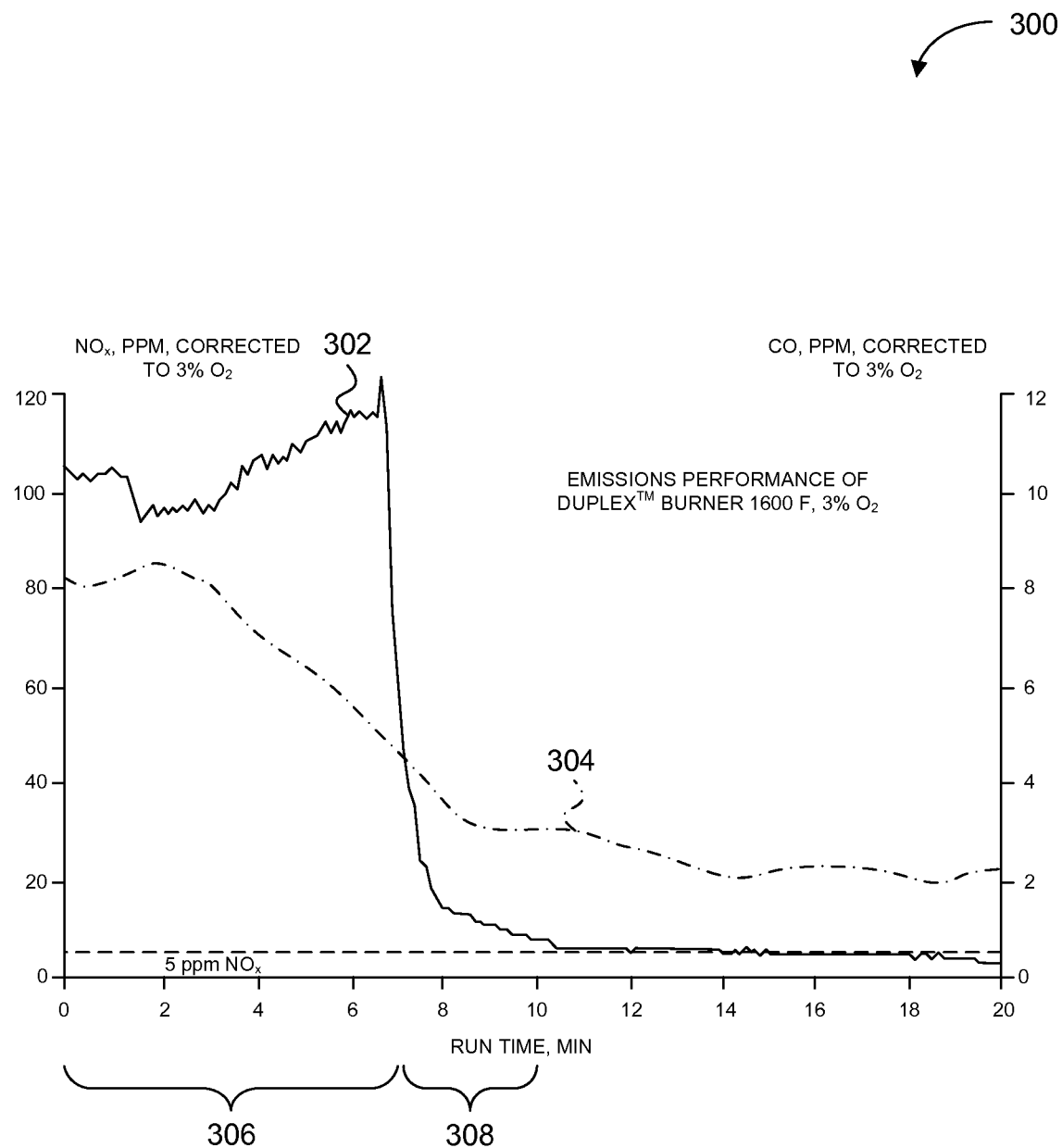
FIG. 3 is a graph of the performance of burner $NO_x$ and CO emissions performance, according to an embodiment.

FIG. 3 is a graphically depiction 300 of representative emissions performance achieved by the burner of FIGS. 1A, 1B, and 2 in one experiment (but representative of many experiments). The inventors performed numerous observations and measurements of the illustrated effect. Data from a particular run is shown in FIG. 3, wherein oxides of nitrogen (NOx) concentration 302 and carbon monoxide (CO) concentration 304 were monitored at the flue with 3% oxygen ($O_2$) stack concentration. The flue gas temperature was 1600° F.

During a 7-minute start-up period 306, the porous flame holder was preheated to reach a start-up temperature characterized by between 800° F. and 1200° F. stack temperature. Visually, this corresponded to a bright reddish orange glow at the center of the porous flame holder 106 of the embodiment 101 shown in FIG. 1B. Pre-heating was performed by a conventional flame held immediately adjacent to a fuel nozzle (depicted as 114a, 114b, 114 in FIGS. 1A and 1B). After 7 minutes, the start-up flame was blown off the start-up flame holder (one variant of a start-up flame holder 116 is depicted in FIG. 1A), and a gaseous mixture (see 104) of diluted fuel and combustion air transferred to the porous flame holder (see 106) where, owing to the elevated temperature of the porous flame holder, the mixture immediately ignited.

Upon flame transfer, NOx concentration dropped precipitously from about 120 parts per million (ppm) characteristic of a conventional (start-up) flame to under 10 ppm. During a transition period 308 from 7-minutes to 10-minutes after start-up, NOx concentration asymptotically approached 5 ppm. After several minutes, NOx output reduced to 2 ppm or lower. During the transition period, fuel flow rate was gradually increased to reach about 1 MBTU/(hr*ft²). During the transition period 308, the porous flame holder equilibrated to a steady state temperature distribution characterized by a bright orange glow. It is also shown that CO emissions were reduced to about 2 ppm.

Subsequent experiments were conducted wherein the NOx concentration was reduced below the 1 ppm detection limit of the flue gas sensor.

Figure 4:
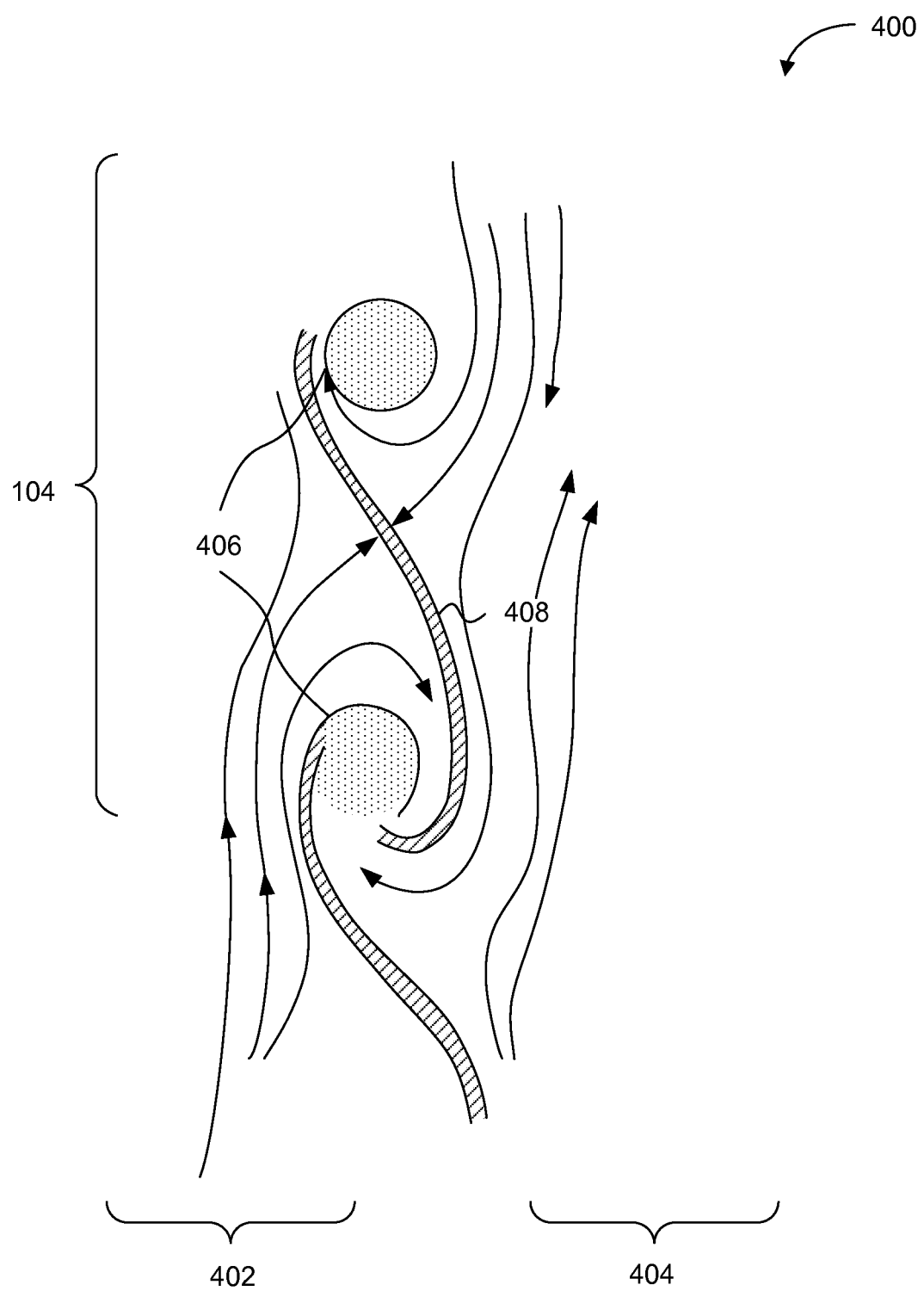
FIG. 4 is a diagram of fuel and combustion air mixing used to produce a gaseous mixture, according to an embodiment.

FIG. 4 is a diagram 400 of fuel and combustion air mixing used to produce a gaseous mixture 104, according to an embodiment. The diagram shows a fuel rich region 402 with an adjacent oxidant rich region 404. Another oxidant rich region (not shown) would be present to the left of the fuel rich region 402, but is omitted for simplicity. While the fuel and combustion air flow through a dilution region (see $D_D$ in FIGS. 1A and 1B), mixing occurs in vortex cores 406 that may, to a first approximation, be regarded as being uniform in composition, having a fuel dilution between that of the fuel rich region 402 and the oxidant rich region 404. Between the vortex cores lies a Taylor layer 408, which at higher respective concentrations of fuel and oxidant than the concentrations in the vortex cores 406. As the stream 104 flows toward the porous flame holder (see 106), relatively pure combustion air and relatively pure fuel are engulfed by the vortex cores 406 in relatively "big gulps". As the stream 104 flows upward, more and more of the Taylor layer 408 is engulfed by the vortex cores to cause the maximum concentration of fuel and air, respectively, to diminish.

The first step in mixing is entrainment. In a free shear flow, such as the turbulent jet, ambient fluid 404 is entrained into the jet 402 by the large-scale engulfment of tongues of ambient fluid. The edges of the tongues are subsequently convoluted by the turbulence into progressively smaller-scale convolutions. According to the leading theory of turbulent mixing, the mixed fluid resides in only two places, the Taylor layer 408 associated with the strain rate of the largest eddies, and the Batchelor layer associated with the strain rate of the smallest eddies. The thicknesses of the Taylor and Batchelor layers are given by the plane, strained, laminar flame solution of Marble. From experiments in gaseous and aqueous shear layers, it turns out that the amount of mixed fluid in the Taylor layer 408 is about equal to that in the Batchelor layer in a gas flow. The fluid mixed at the Batchelor scale accumulates in the vortex cores and becomes essentially volume-filling, as sketched in FIG. 4.

Referring to FIGS. 1A and 1B, according to an embodiment, the fuel nozzle assembly 102 is configured to mix the gaseous mixture 104 sufficiently to substantially destroy Taylor layers 408 between pure fuel and air carrying the oxidant. In a non-premixed burner 100, 101 illustrated by FIGS. 1A and 1B, the fuel nozzle assembly 102 includes one or more fuel nozzles 114, 114a, 114b configured to output substantially pure fuel. The fuel nozzle assembly 102 further includes a combustion air source 118a, 118b, 118 configured to provide combustion air. In a non-premixed system, the combustion air may be provided as natural draft or by forced draft using, e.g., a blower. As the fuel from the fuel nozzles 114a, 114b, 114 travels upward through a dilution distance $D_D$, it entrains combustion air, which causes dilution. Typically the fuel jet expands at a 15° solid angle (shown diagrammatically in FIG. 1B), with the entirety of expansion corresponding to additional combustion air being incorporated into the fuel.

According to an embodiment, the fuel nozzle assembly 102 is configured to output the gaseous mixture 104 (including fuel and oxidant) to the porous flame holder 106 with sufficient air or flue gas to cause the gaseous mixture 104 to be fuel-lean of a stoichiometric mixture. In some embodiments, the fuel nozzle assembly 102 is configured to output the gaseous mixture 104 substantially at a lean flammability limit of the fuel. The lean fuel and air mixture 104 can be used to reduce combustion temperature inside the porous flame holder 106.

The porous flame holder 106 has been found to output a significant amount of heat from the combustion reaction as thermal radiation 212. In other words, the porous flame holder 106 is configured to radiate heat away from the reacting portion of the gaseous mixture. In other words, the porous flame holder 106 is configured to radiate heat away from the combustion reaction supported by the gaseous mixture 104. The porous flame holder 106 can configured to radiate heat away from the combustion reaction sufficiently to cause the gaseous mixture 104 to burn at or below 2000° F., wherein the gaseous mixture 104 consists essentially of air, methane, and flue gas from the combustion reaction. In some embodiments, the porous flame holder 106 is configured to radiate heat away from the combustion reaction sufficiently to cause the gaseous mixture 104 to burn at about 1700° F., wherein the gaseous mixture consists essentially of air, methane, and flue gas from the combustion reaction. Another aspect of the porous flame holder 106 is that it causes combustion to be completed in a very short time, which reduces the output of thermal NOx.

As described above, the burner 100, 101 can include a start-up flame holder 116 configured to hold the combustion reaction having a richer fuel mixture than the porous flame holder 106, wherein the start-up flame holder 116 is configured to support the combustion reaction at a location configured to pre-heat the porous flame holder 106.

The fuel nozzle assembly 102 can include a single fuel nozzle 114 or a plurality of nozzles 114a, 114b configured to output substantially pure fuel. The fuel nozzle assembly 102 can include an air source 118a, 118b, 118 configured to output substantially pure air. The fuel nozzle assembly 102 and porous flame holder 106 can be disposed to define a mixing zone $D_D$ configured to allow mixing of the substantially pure fuel with the substantially pure air to produce a uniform gaseous mixture at the upstream surface 108 of the porous flame holder 106.

Alternatively, the burner 100, 101 can be configured as a pre-mix burner. In a pre-mix burner, the fuel nozzle assembly 102 includes a premixing chamber (not shown) operatively coupled to one or more fuel nozzles 114a, 114b, 114 and one or more air sources 118a, 118b, 118, and configured to uniformly mix fuel and air to form the gaseous mixture 104. In a pre-mix burner 100, 101, aflame arrestor can be disposed between the mixing chamber and the porous flame holder to prevent flashback.

Referring to FIG. 1A, a burner system 100 may include several spatial and temporal features surrounding a conventional nozzle 114a, 114b. The geometric elements can include a lower story tile 120, and the porous flame holder 106 supported above the lower story tile 120 by a support structure 122. When the fuel is directed to the lower story tile 120, the resulting recirculation of the hot gas anchors the combustion reaction in that region. This start-up mode is maintained until a characteristic temperature is attained. For example, the characteristic temperature could be the temperature of the porous flame holder 106 or some related temperature such as the ultimate system operation temperature or a switching temperature measured at the flue. Once the characteristic temperature is attained, a switching operation is initiated, which then anchors the combustion reaction at the porous flame holder 106. Combustion in the latter configuration dramatically reduces NOx via a variety of mechanisms. For example, so-called thermal NOx is a function of three main factors: flame temperature, oxygen concentration, and time under such favorable NOx formation conditions. By increasing the amount of entrained flue gas, oxygen concentration and NOx-forming species are diluted. The greater entrainment also provides more thorough mixing and shorter flames and reduced time to form NOx. Inasmuch as flame chemistry is much faster than fuel/air mixing, flame length in diffusion flames is primarily determined by the mixing of fuel and air to form a flammable mixture. By premixing the fuel and air before combustion on the upperstory tile, flame length is reduced. Since flame length is one parameter that limits the total heat output, its decrease allows for greater firing rate in a given furnace leading to greater process throughput.

As indicated above, the porous flame holder 106 plays two critical roles, according to embodiments. First, the porous flame holder 106 acts as a flame holder, fixing the ignition location. Second, the porous flame holder efficiently radiates energy away from the hot combustion products, thereby cooling them. The greater thermal conductivity of the porous flame holder 106 as compared to the flue gas also homogenizes flame temperature. Inasmuch as thermal NOx formation is exponentially related to flame temperature, small volumes of higher temperature gas (so-called "hot spots") can contribute to the lion's share of NOx formation. Therefore, a flame with fewer hot spots will generate less NOx ceteris paribus.

Referring to FIG. 2, the hot combustion products transfer heat to the walls 104 of the porous flame gas passages 110. Each wall 104 may then radiates infrared and visible energy. Some of that energy is radiated upstream. Combined with thermal conduction 210 through the perforated flame holder 106, thermal radiation 212 heats each gas passage wall in a region 206 and provides a heating source for the oncoming cold reactants flowing into the porous flame holder 106. By transferring the energy upstream, the residence time of the unburned reactants in the heated zone is increased, which may improve the turndown ratio of the burner.

Thermal radiation 212 also is output toward the furnace walls and/or other heat loads in the system. As a consequence, the temperature of the combustion products is promptly reduced, lowering the NOx emissions. The solid surface of the perforated flame holder 106 is a much better radiator than the combustion products, especially if there is little soot.

Unlike a diffusion flame, the burner 100, 101 of FIGS. 1A, 1B, and 2 delays combustion until sufficient entrainment of air and flue gas insures low combustion reaction temperatures and low NOx emissions. During operation, combustion occurs in the burner far downstream from the fuel nozzle(s) 114a, 114b, 114, so that every parcel of injected fuel has mixed with sufficient air to be lean of stoichiometric. The Taylor layers (see FIG. 4, 408) between pure fuel and air have been destroyed, and the vortex cores 406 are lean. Consequently, the temperature of the combustion products is relatively low.

Figure 5:
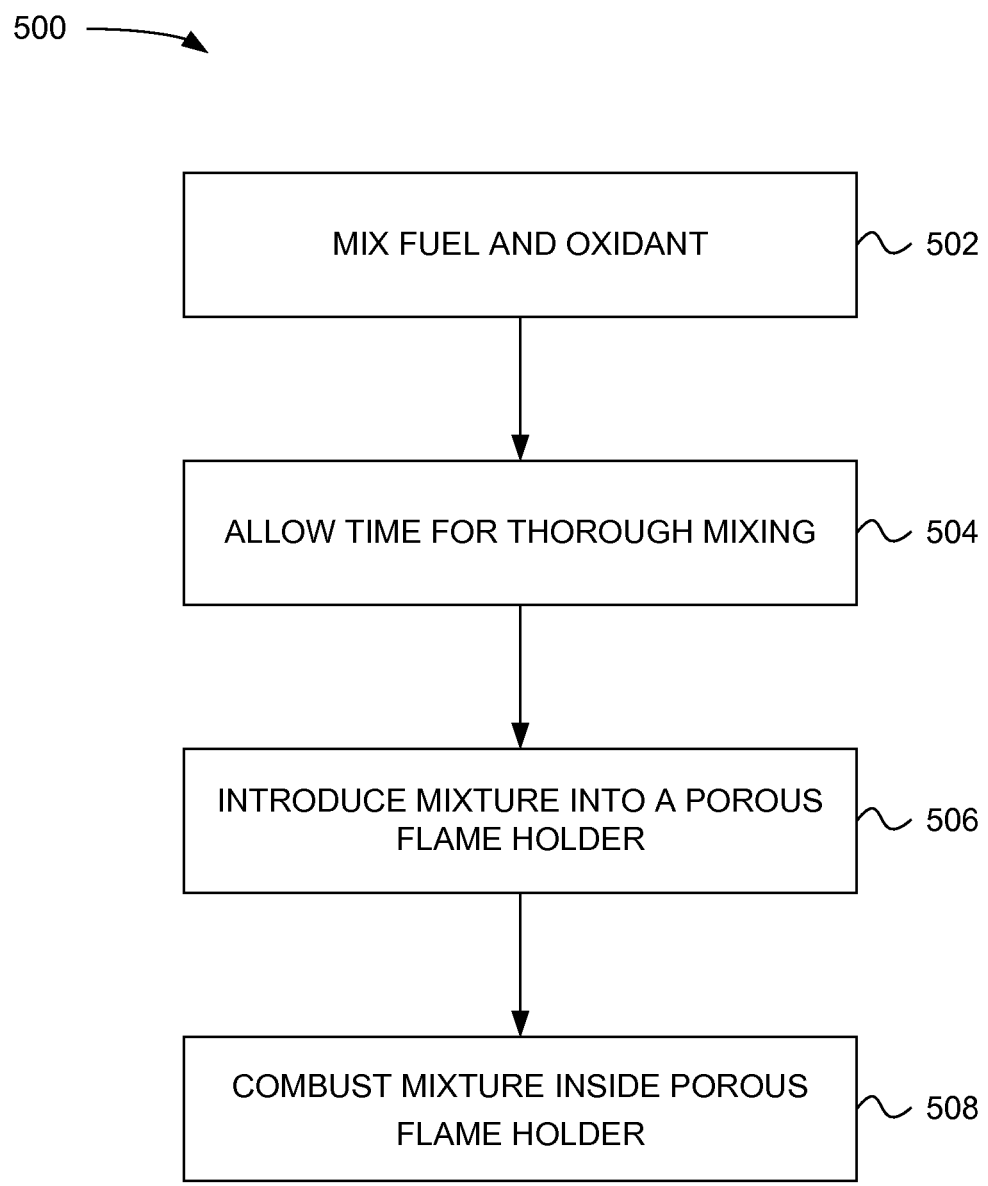
FIG. 5 is a flow chart showing a method for using the apparatus shown in FIGS. 1A, 1B and 2, according to an embodiment.

FIG. 5 is a flowchart showing a method 500 of operating the burners of FIGS. 1A, 1B, and 2 to lower combustion NOx, according to an embodiment. Prior to the steps of the method 500, a start-up temperature and/or operating temperature is established in the porous flame holder. As described above, establishing a start-up temperature can be performed by holding a conventional flame held by a start-up flame holder in a position to cause heating of the porous flame holder.

At step 502, fuel and oxidant are combined into a gaseous mixture. The gaseous mixture may include a turbulently-moving gas. In one embodiment, step 502 includes outputting a substantially pure fuel jet from a fuel nozzle and outputting substantially pure combustion air from a combustion air source. The fuel jet can entrain the air (including oxygen as the oxidant). The air may be introduced by natural convection through an air source concentric to the fuel nozzle, for example. In other embodiments, the air is introduced by forced convection from a blower.

Outputting a substantially pure fuel jet can include operating a fuel nozzle assembly including a plurality of nozzles each configured to output substantially pure fuel. The fuel nozzle assembly can include an air source configured to output substantially pure air.

Proceeding to step 504, time is allowed for the gaseous mixture to evolve to a better-mixed state. Step 504 may include time for turbulent mixing, for example. In the embodiments of FIGS. 1A and 1B, the mixing time is provided by the dilution distance $D_D$ through which the gaseous mixture travels. The fuel nozzle assembly and placement of the porous flame holder can define a mixing zone configured to allow the time for mixing of substantially pure fuel with substantially pure air to produce a uniform gaseous mix at the porous flame holder.

Step 504 may include allowing time sufficient to substantially destroy Taylor layers between pure fuel and air carrying the oxidant. Step 504 may include providing sufficient air or flue gas to cause the fuel to be at a lean of stoichiometric mixture. Step 504 can include forming the mixture to be substantially at a lean flammability limit of the fuel.

In step 506 the gaseous mixture is introduced into a porous flame holder. Step 506 can include simultaneously introducing the gaseous mixture to an upstream surface of the porous flame holder such that the gaseous mixture enters a plurality of gas passages simultaneously. The porous flame holder can be formed from a refractory material such as alumina, mullite, and/or cordierite. In another embodiment, the porous flame holder can be formed from a superalloy such as Hastelloy or Inconel.

In step 508, the gaseous mixture is combusted inside a porous flame holder. The porous flame holder (see 106) is configured to conduct heat sufficiently to cause combustion to be supported inside the porous flame holder. The step of combusting the mixture includes passing the mixture (and a combustion reaction, and combustion reaction products) through gas passages of the porous flame holder. In an embodiment, the gas passages have a minimum dimension equal to or greater than a quenching distance associated with the fuel. The gas passages may have substantially constant cross sectional areas. In an embodiment, the gas passages are formed at a pitch of 10 per lineal inch across an upstream surface of the porous flame holder or at a lower pitch (larger cells). For example, the gas passages can formed at a pitch of 4 per inch or higher across two dimensions of the porous flame holder.

Step 508 includes receiving heat evolved from the combustion reaction through walls of the gas passages. The heat can be radiated, conducted, or radiated and conducted toward the upstream surface of the porous flame holder. The hot walls then transfer heat toward unreacted portions of the gaseous mixture to heat the gaseous mixture up to a combustion temperature. Step 508 also includes radiating heat away from the porous flame holder to cool the combustion sufficient to cause the mixture to burn at or below 2000° F. In some embodiments, the porous flame holder radiates sufficient heat away from the combustion reaction to cause the mixture to burn at or below 1700° F.

Optionally, steps 502 and 504 can include operating a fuel premixer. Operating the fuel premixer can include using a premixing chamber to uniformly mix the fuel and oxidant mixture and disposing a flame arrestor between the mixing chamber and the porous flame holder.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A burner, comprising:
    a fuel nozzle assembly configured to output at least one jet of substantially pure fuel configured to entrain oxidant to provide a gaseous mixture including the fuel and the oxidant; and
    a porous flame holder defining gas passages each having a minimum lateral dimension equal to or greater than a fuel quenching distance, the gas passages being aligned to receive the gaseous mixture from the fuel nozzle assembly, the gas passages being configured to pass a combustion reaction supported by the gaseous mixture;
    wherein the gas passages each include a respective wall arranged and configured to receive heat from a reacting portion of the gaseous mixture at a heat receiving area of the wall, convey the received heat via at least one of thermal conduction and thermal radiation to an upstream portion of the wall adjacent to an unreacted portion of the gaseous mixture, and transfer the heat to the unreacted portion of the gaseous mixture within the gas passage; and
    wherein the fuel nozzle assembly is configured to mix the gaseous mixture sufficiently to, as the gaseous mixture approaches the porous flame holder, substantially destroy Taylor layers between the substantially pure fuel and air carrying the oxidant in a structurally uninterrupted space between the fuel nozzle assembly and the porous flame holder.

2. The burner of claim 1, wherein the gas passages are further configured to fix a location of the combustion reaction in a flow of the gaseous mixture.

3. The burner of claim 1, wherein the fuel nozzle assembly is configured to output the gaseous mixture to the porous flame holder with sufficient air or flue gas to cause the fuel to be at a lean of stoichiometric mixture.

4. The burner of claim 3, wherein the fuel nozzle assembly is configured to output the gaseous mixture substantially at a lean flammability limit of the fuel.

5. The burner of claim 1, wherein the porous flame holder is configured to radiate heat away from the combustion reaction supported by the gaseous mixture.

6. The burner of claim 1, wherein the porous flame holder is configured to radiate heat away from the combustion reaction sufficiently to cause the gaseous mixture to burn at or below 2000° F., wherein the gaseous mixture consists essentially of air, methane, and flue gas from the combustion reaction.

7. The burner of claim 6, wherein the porous flame holder is configured to radiate heat away from the combustion reaction sufficiently to cause the gaseous mixture to burn at about 1700° F., wherein the gaseous mixture consists essentially of air, methane, and flue gas from the combustion reaction.

8. The burner of claim 1, wherein the gas passages have substantially constant cross-sectional areas.

9. The burner of claim 1, wherein the gas passages are formed at a pitch of 10 per inch or less across two dimensions of the porous flame holder.

10. A burner, comprising:
    a fuel nozzle assembly configured to output at least one jet of substantially pure fuel configured to entrain oxidant to provide a gaseous mixture including the fuel and the oxidant; and
    a porous flame holder defining gas passages each having a minimum lateral dimension equal to or greater than a fuel quenching distance, the gas passages being aligned to receive the gaseous mixture from the fuel nozzle assembly, the gas passages being configured to pass a combustion reaction supported by the gaseous mixture;
    wherein the gas passages each include respective walls arranged and configured to receive heat from a reacting portion of the gaseous mixture, radiate or conduct the heat toward an upstream portion of the wall adjacent to an unreacted portion of the gaseous mixture, and transfer the heat to the unreacted portion of the gaseous mixture within the gas passage;
    wherein the fuel nozzle assembly is configured to, as the gaseous mixture approaches the porous flame holder, mix the gaseous mixture sufficiently to substantially destroy Taylor layers between the substantially pure fuel and air carrying the oxidant in a structurally uninterrupted space between the fuel nozzle assembly and the porous flame holder; and
    wherein the gas passages are formed at a pitch of 4 per inch or more than 4 per inch across two dimensions of the porous flame holder.

11. The burner of claim 1, wherein the porous flame holder is formed from a refractory material.

12. The burner of claim 1, wherein the fuel nozzle assembly includes a plurality of nozzles configured to output substantially pure fuel.

13. The burner of claim 12,
    wherein the fuel nozzle assembly includes an air source configured to output substantially pure air; and
    wherein the fuel nozzle assembly defines a mixing zone configured to allow mixing of the substantially pure fuel with the substantially pure air to produce a uniform gaseous mixture at the porous flame holder.

14. A method of lowering combustion NOx, comprising:
    outputting, from a fuel nozzle assembly, at least one jet of substantially pure fuel and entrained oxidant toward a porous flame holder; then
    allowing time for a mixture of the fuel and oxidant to evolve to a better-mixed state while the fuel and the oxidant traverse a structurally uninterrupted dilution distance between the fuel nozzle assembly and the porous flame holder, the dilution distance selected to permit said allowing of time; and then
    combusting the mixture inside the porous flame holder;
    wherein walls of gas passages of the porous flame holder are each configured to radiate or conduct heat, received from the combusting of the mixture at a heat receiving region of the respective wall, to an upstream region of the wall adjacent to an unreacted portion of the mixture, and transfer the heat to the unreacted portion of the mixture sufficiently to cause the combustion to be supported inside the porous flame holder, and
    wherein the dilution distance between the fuel nozzle assembly and the porous flame holder is selected to permit substantial destruction of Taylor layers between the substantially pure fuel and air carrying the oxidant as the mixture reaches the porous flame holder.

15. The method of claim 14, wherein the step of combusting the mixture comprises passing the mixture through the gas passages of the porous flame holder, the gas passages having a minimum lateral dimension equal to or greater than a fuel quenching distance of the mixture.

16. The method of claim 15, wherein the gas passages have substantially constant cross-sectional areas.

17. The method of claim 15, wherein the gas passages are formed at a pitch of 10 per inch or less across two dimensions of the porous flame holder.

18. A method of lowering combustion NOx, comprising:
outputting, from a fuel nozzle assembly, at least one jet of substantially pure fuel and entrained oxidant toward a porous flame holder; then
allowing time for a mixture of the fuel and the oxidant to evolve to a better-mixed state while the fuel and the oxidant traverse a structurally uninterrupted dilution distance between the fuel nozzle assembly and the porous flame holder, the dilution distance selected to permit said allowing of time; and then
combusting the mixture inside the porous flame holder;
wherein walls of gas passages of the porous flame holder are each configured to radiate or conduct heat, received from the combusting of the mixture, to a portion of the mixture in another portion of the gas passage sufficiently to cause the combustion to be supported inside the porous flame holder,
wherein the dilution distance between the fuel nozzle assembly and the porous flame holder is selected to permit substantial destruction of Taylor layers between the substantially pure fuel and air carrying the oxidant as the mixture reaches the porous flame holder,
wherein the step of combusting the mixture comprises passing the mixture through the gas passages of the porous flame holder, the gas passages having a minimum lateral dimension equal to or greater than a fuel quenching distance of the mixture; and
wherein the gas passages are formed at a pitch of 4 per inch or more across two dimensions of the porous flame holder.

19. The method of claim 15, wherein the gas passages include a wall configured to receive heat from a reacting portion of the mixture, radiate the heat toward an unreacted portion of the mixture, and receive the radiated heat adjacent to the unreacted portion of the mixture.

20. The burner of claim 14, wherein the step of outputting fuel and oxidant further comprises providing sufficient air or flue gas to cause the fuel to be at a lean of stoichiometric mixture.

21. The burner of claim 20, further comprising forming the better-mixed state of the mixture to be substantially at a lean flammability limit of the fuel.

22. The method of claim 14, further comprising configuring a radiative property of the porous flame holder sufficient to radiate heat away from the combustion to cause the mixture to burn at or below 2000° F., when the gaseous mixture consists essentially of air, methane, and flue gas from a combustion reaction.

23. The method of claim 22, further comprising configuring the radiative property of the porous flame holder sufficient to radiate the heat away from the combustion to cause the mixture to burn at or below 1700° F., when the gaseous mixture consists essentially of the air, the methane, and the flue gas from the combustion reaction.

24. The method of claim 14, wherein the fuel nozzle assembly in the step of outputting fuel and oxidant includes a plurality of nozzles configured to output substantially pure fuel.

25. The method of claim 24,
wherein the fuel nozzle assembly includes an air source configured to output substantially pure air; and
wherein the fuel nozzle assembly defines a mixing zone configured to allow mixing of the substantially pure fuel with the substantially pure air to produce a uniform gaseous mix at the porous flame holder.

26. The burner of claim 14, wherein the porous flame holder is formed from a refractory material.

27. A diluted fuel burner, comprising:
a fuel nozzle assembly configured to output at least one jet of substantially pure fuel and to entrain oxidant to produce a gaseous mixture including the fuel and the oxidant;
a porous flame holder defining gas passages aligned to receive the gaseous mixture from the fuel nozzle assembly, the gas passages being configured to carry a combustion reaction supported by the gaseous mixture; and
a porous flame holder support structure configured to hold the porous flame holder away from the fuel nozzle assembly at a structurally uninterrupted dilution distance selected to allow dilution of the gaseous mixture;
wherein the dilution distance is selected to permit substantial destruction of Taylor layers between the substantially pure fuel and air carrying the oxidant as the mixture approaches the porous flame holder.

28. The diluted fuel burner of claim 27, wherein the gas passages include respective walls each configured to receive heat from a reacting portion of the gaseous mixture, radiate or conduct the heat toward an upstream region of the wall adjacent to an unreacted portion of the gaseous mixture, and transfer the heat into the unreacted portion of the gaseous mixture within the gas passage.

29. The burner of claim 1, wherein the gas passages have non-constant cross-sectional areas.

30. The burner of claim 1, further comprising a natural draft, non-pressurized oxidant source.

* * * * *